Figure 11:
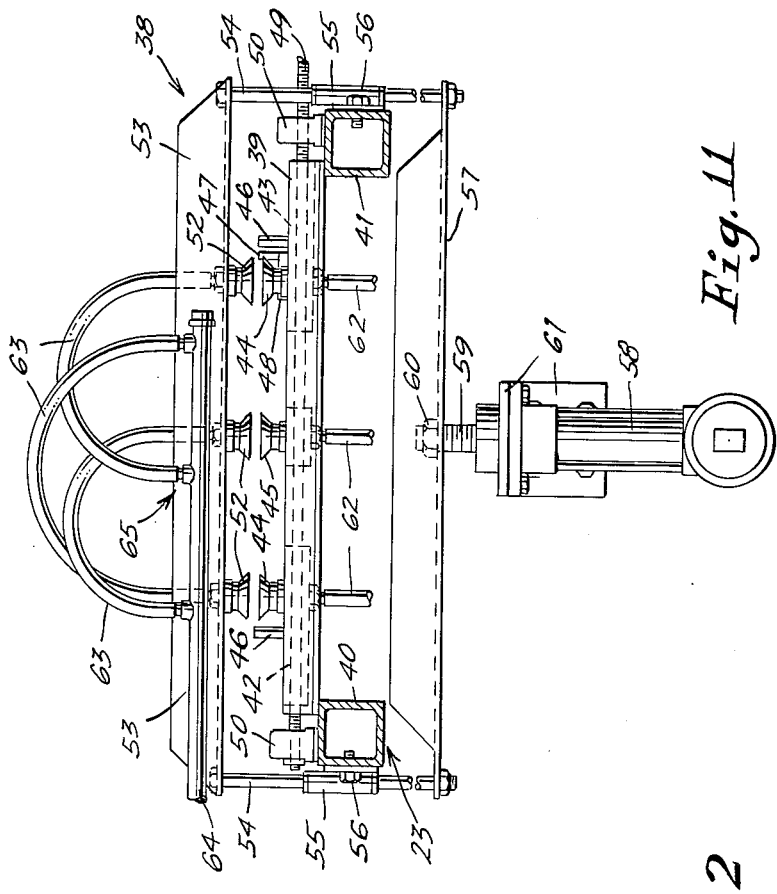

Jan. 22, 1963 W. A. SCHROEDER 3,074,325
PLASTIC LINER INSERTING MACHINE
Filed April 5, 1962 10 Sheets-Sheet 1
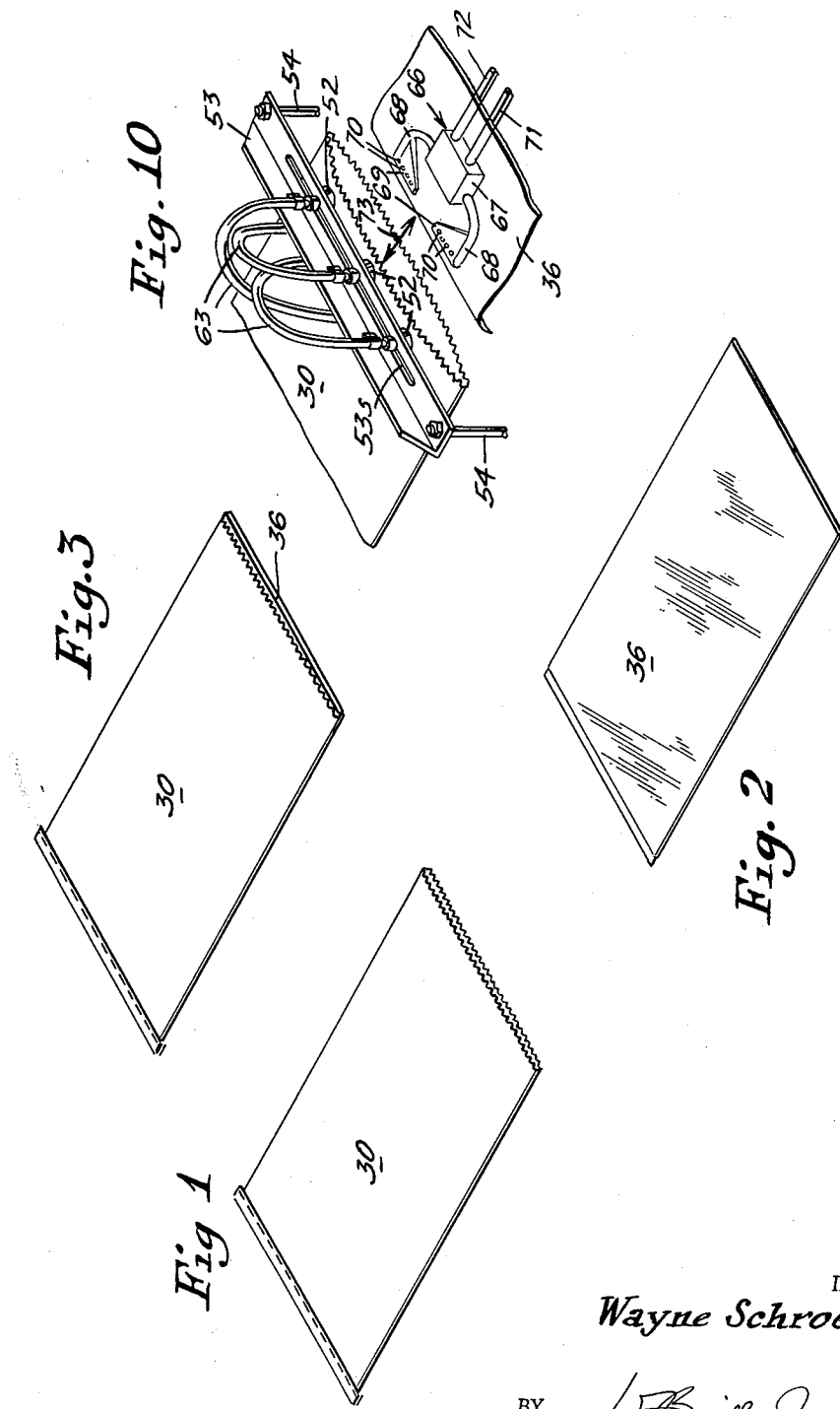
INVENTOR
Wayne Schroeder,
BY
ATTORNEY

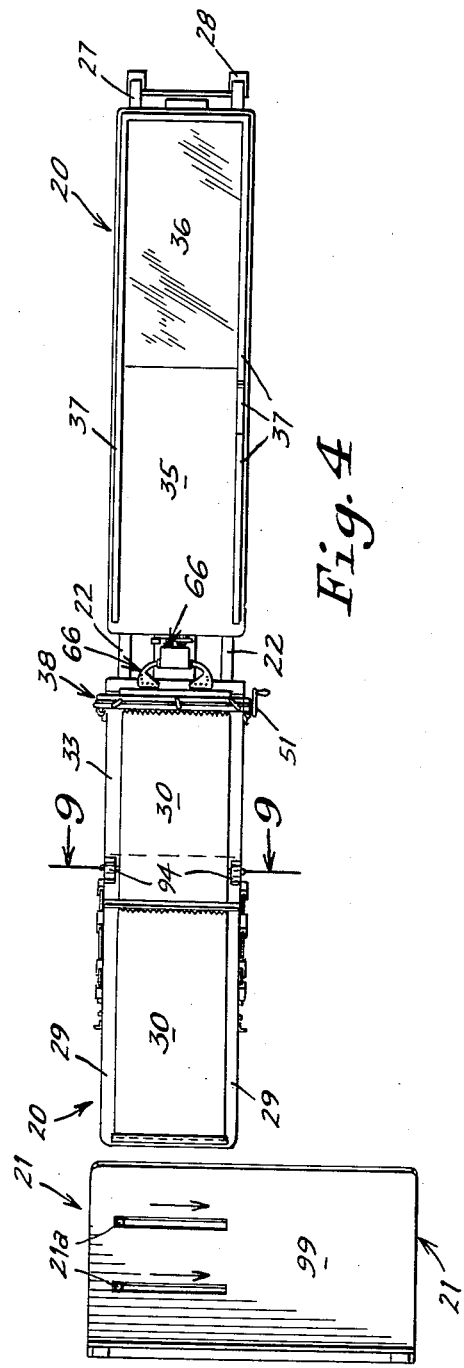
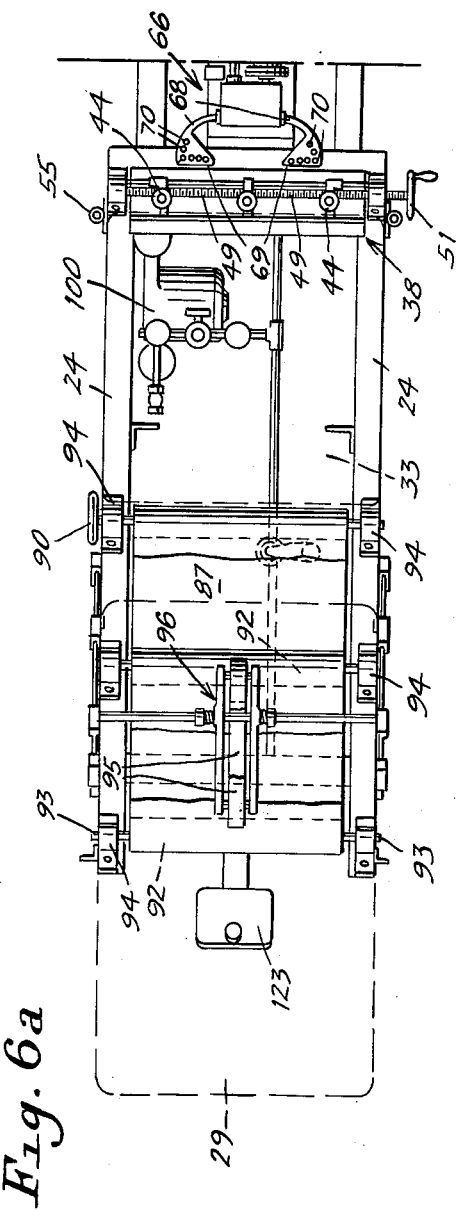

Jan. 22, 1963 W. A. SCHROEDER 3,074,325
PLASTIC LINER INSERTING MACHINE
Filed April 5, 1962 10 Sheets-Sheet 3
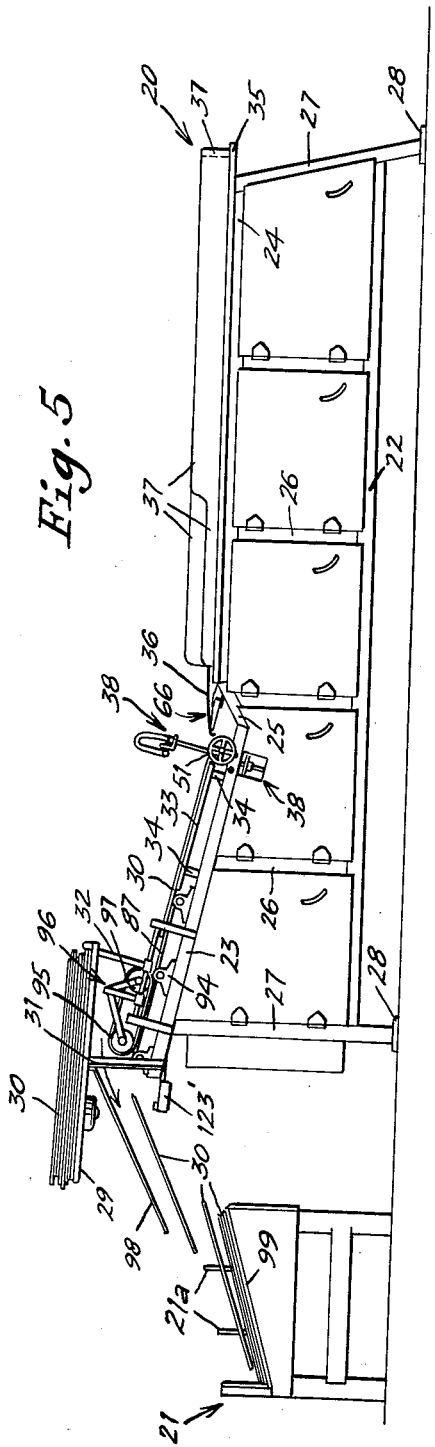
INVENTOR
Wayne Schroeder,
BY
ATTORNEY

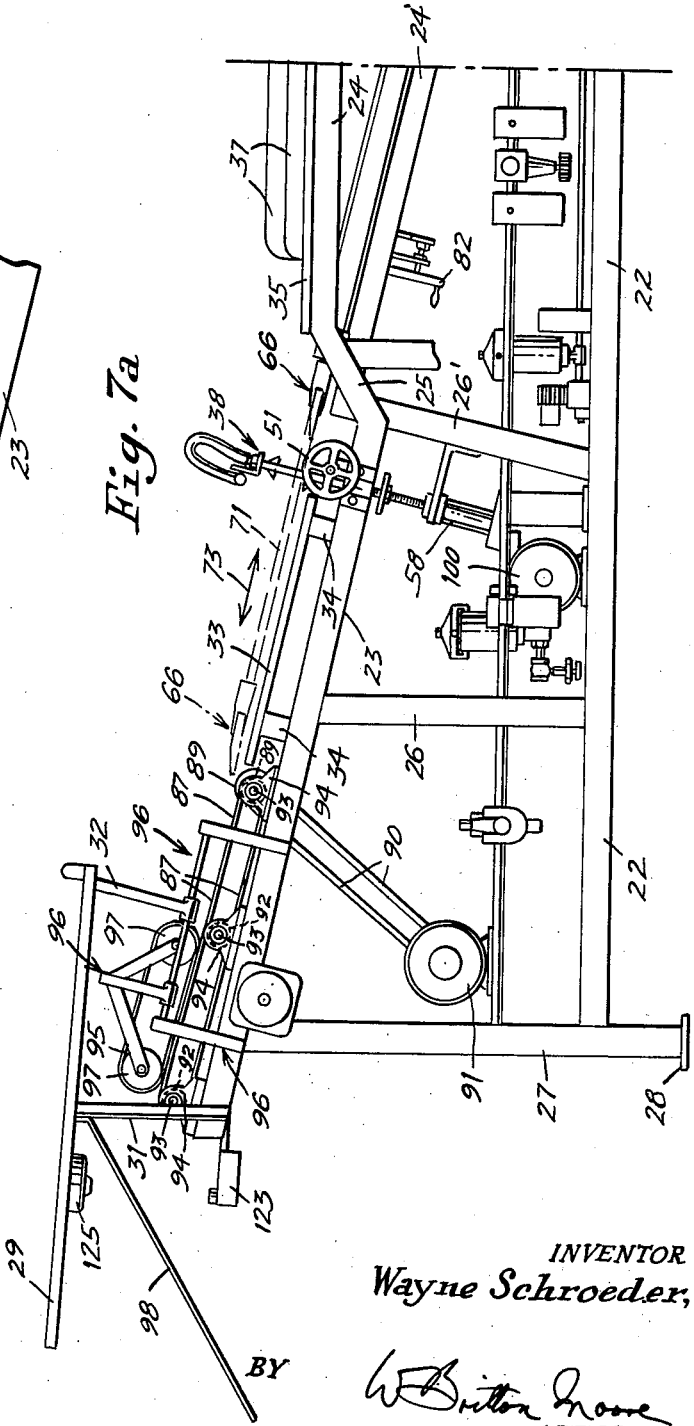

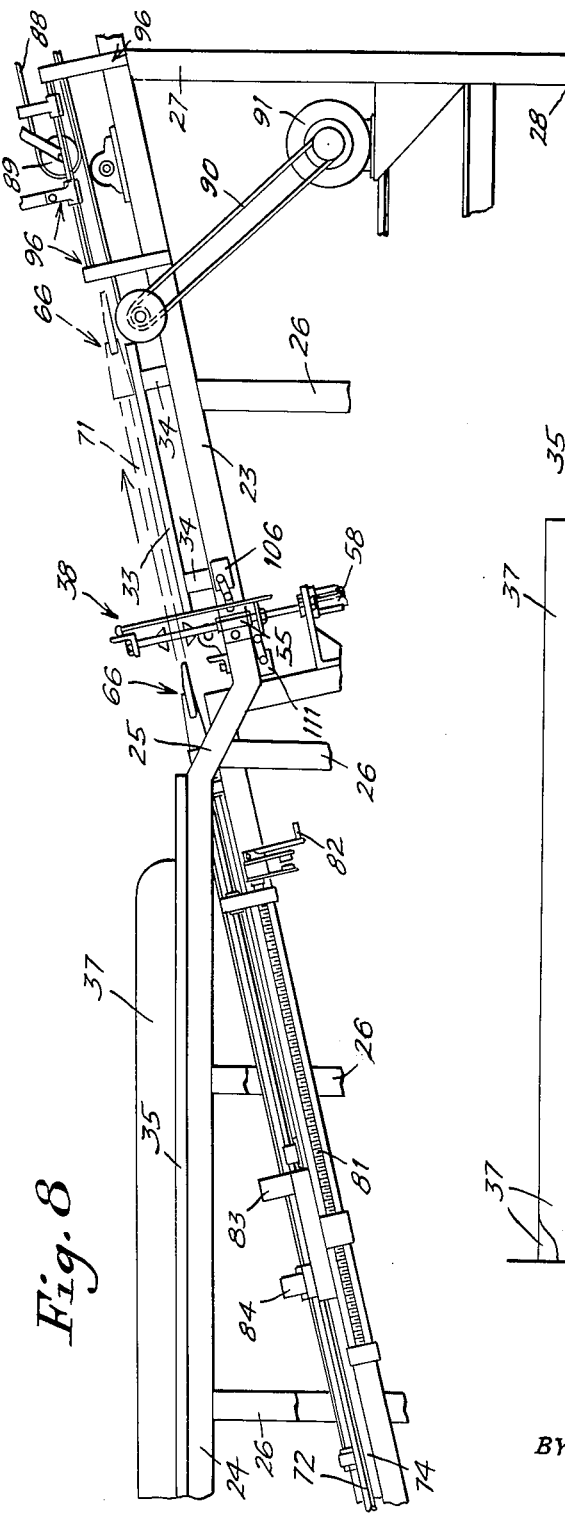

Jan. 22, 1963   W. A. SCHROEDER   3,074,325
PLASTIC LINER INSERTING MACHINE
Filed April 5, 1962   10 Sheets-Sheet 6

INVENTOR
Wayne Schroeder,
BY W. Britton Moore
ATTORNEY

Jan. 22, 1963   W. A. SCHROEDER   3,074,325
PLASTIC LINER INSERTING MACHINE
Filed April 5, 1962   10 Sheets-Sheet 8

INVENTOR
Wayne Schroeder,
BY
ATTORNEY

INVENTOR
Wayne Schroeder,
BY W Briton Moore
ATTORNEY

United States Patent Office 3,074,325
Patented Jan. 22, 1963

3,074,325
PLASTIC LINER INSERTING MACHINE
Wayne A. Schroeder, Philadelphia, Pa., assignor to Chase
Bag Company, a corporation of Delaware
Filed Apr. 5, 1962, Ser. No. 185,311
35 Claims. (Cl. 93—8)

This invention relates to a plastic liner inserting machine and it consists in the combinations, constructions and arrangements of parts hereinafter described and claimed.

Generally there is provided a semiautomatic machine having at one end thereof a flat horizontal table on which plastic liner bags can be stacked with their closed ends positioned adjacent the inner end of the table. On the other end of the machine there is mounted a tilted flat table. Above the upper end of the tilted table is positioned a platform on which the bags to be lined are stacked with their open ends directed toward the center of the machine. The lower end of the tilted table is horizontally spaced from the inner end of the horizontal table centrally of the machine at the insertion-initiating zone thereof.

The insertion-initiating zone comprises stop means for arresting movement of a bag manually slid by an operator onto and along the tilted table, a switch for sensing the presence of the bag in operative position, and relatively movable sets of suction cups for opening the positioned bags. Under the horizontal table there is mounted a pneumatically operated cylinder having a piston rod axially aligned with the bag held open on the tilted table. The piston rod has a chambered Y-shaped head provided with upwardly facing apertures which, when connected to a source of vacuum, grip and hold the closed end of a plastic liner bag for axial insertion thereof into the open end of the bag positioned on the tilted table. Compressed air is then blown through the apertures in the Y-shaped head to free the plastic liner therefrom. Next, the Y-shaped head is withdrawn from the finished lined bag, which had been propelled by the insertion stroke of the head into engagement with a conveyor. The conveyor ejects and stacks the finished bags on an indexing machine which automatically counts and periodically ejects the finished bags in stacks of preselected quantities.

An electric control system automatically and sequentially operates the machine through each cycle after the cycle is started by the closing of two switches, one responsive to the presence of a bag at the insertion-initiating zone and the other responsive to increased vacuum in the head conduit caused by closing of the suction apertures by a liner bag engaged and held thereby. Over twenty-five bags per minute have been lined by this machine on production runs.

It is accordingly an object of the present invention to provide a machine for quickly and efficiently inserting plastic liners into open mouth bags of paper or like materials.

It is another object of the invention to provide a machine of the character set forth in which the bag mouth is opened by suction cups and the liner is inserted by a piston rod having a perforated hollow head which grips the liner by vacuum and releases the same by compressed air acting through the perforations therein.

It is a further object of the invention to provide a machine of the character described having an automatic control system for completing the operational cycle safely and reliably after initiation thereof by the joint actions of control means responsive to bag presence and vacuum-operated means responsive to closing of apertures in the inserter head by the placement of a liner thereon.

It is a further object of the invention to provide a machine of the type disclosed including an indexing device for assembling the lined bags in stacks of predetermined quantities.

It is still a further object of the present invention to provide a liner inserting machine which closes, as by sewing, one end of each bag immediately prior to insertion of a liner therein.

It is yet another object of the invention to provide a liner inserting machine which is fully automatic, the liners being heat sealed and cut by the machine from flat tubular plastic material.

Figure 12:
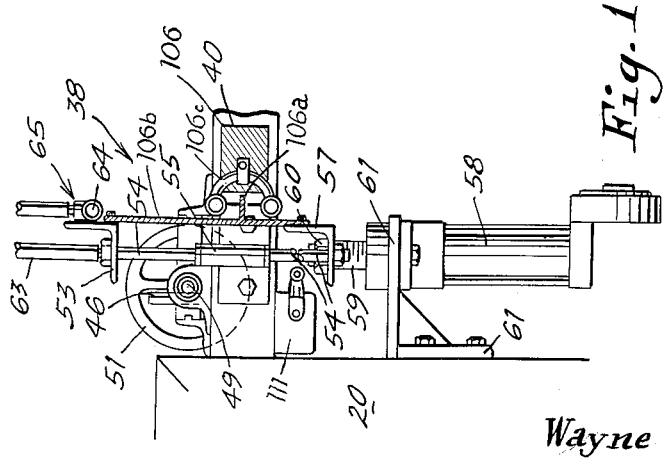
Figure 13:
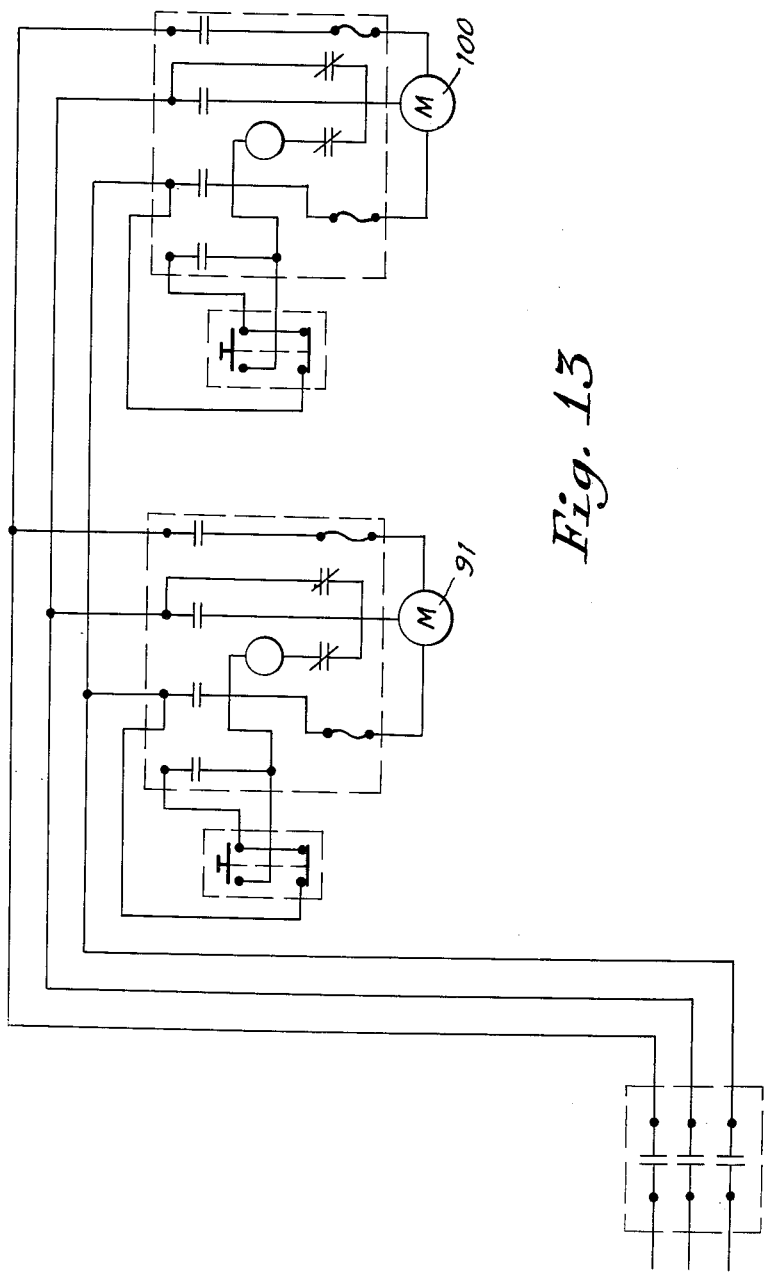
Figure 14:
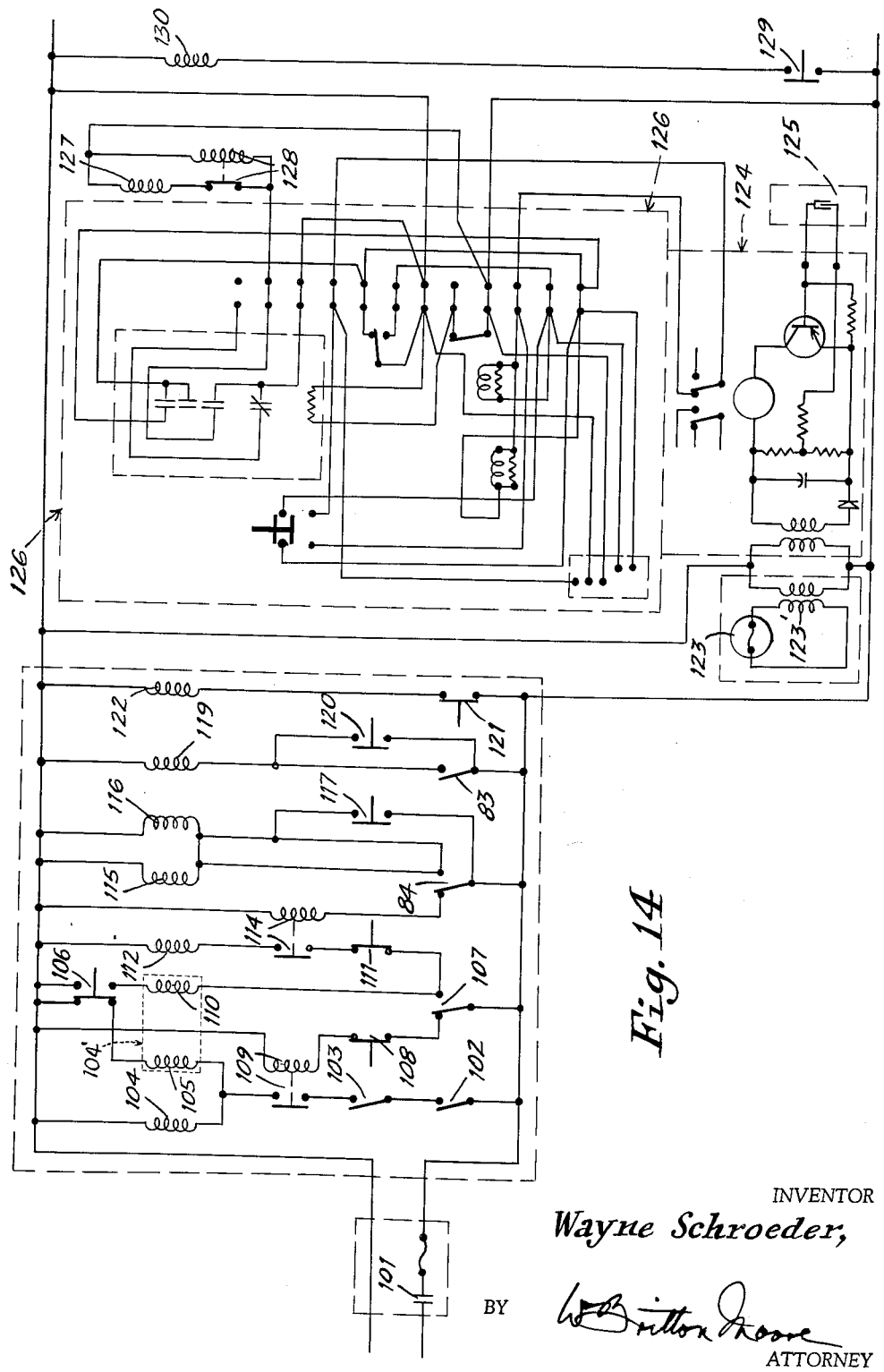
Figure 15:
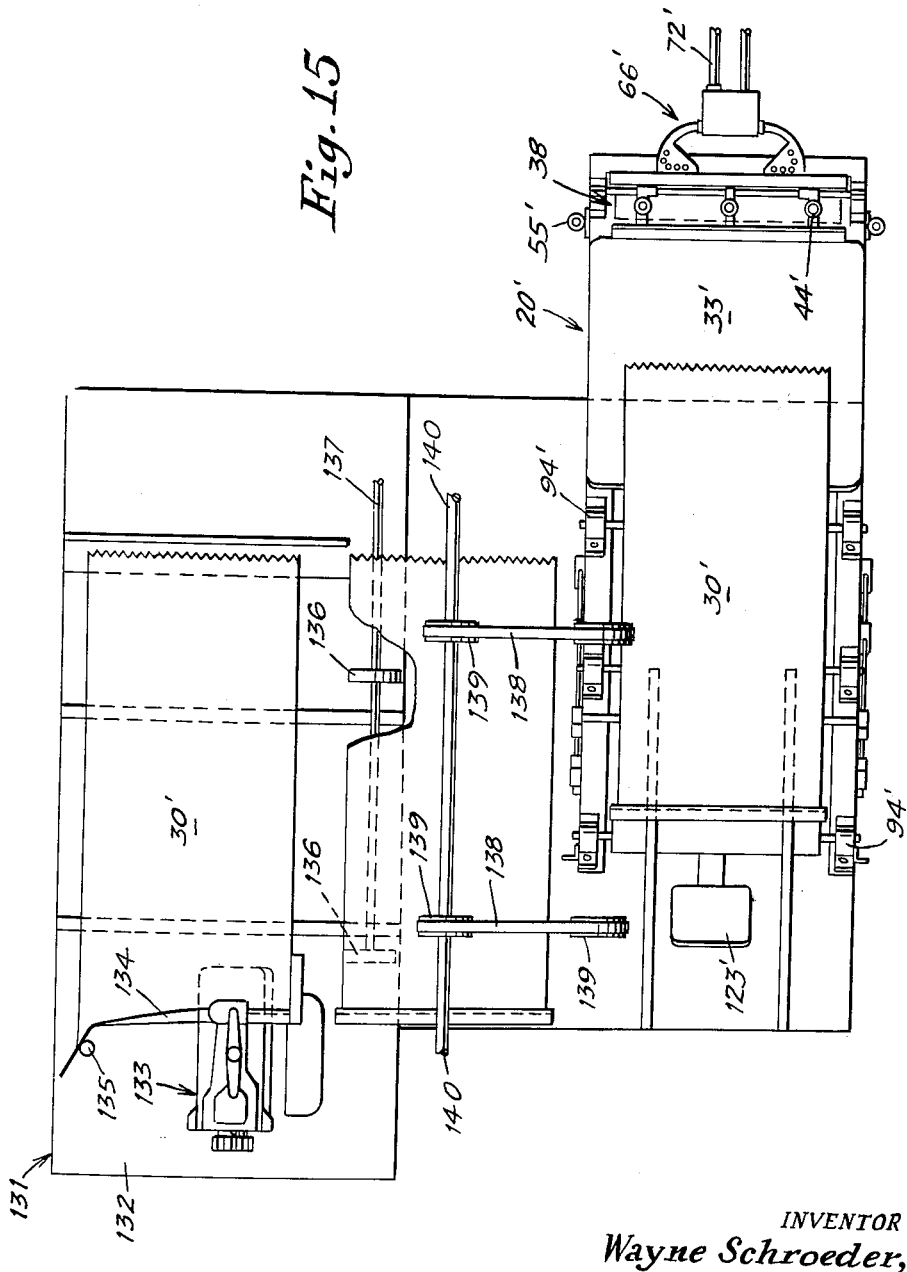
Figure 16:
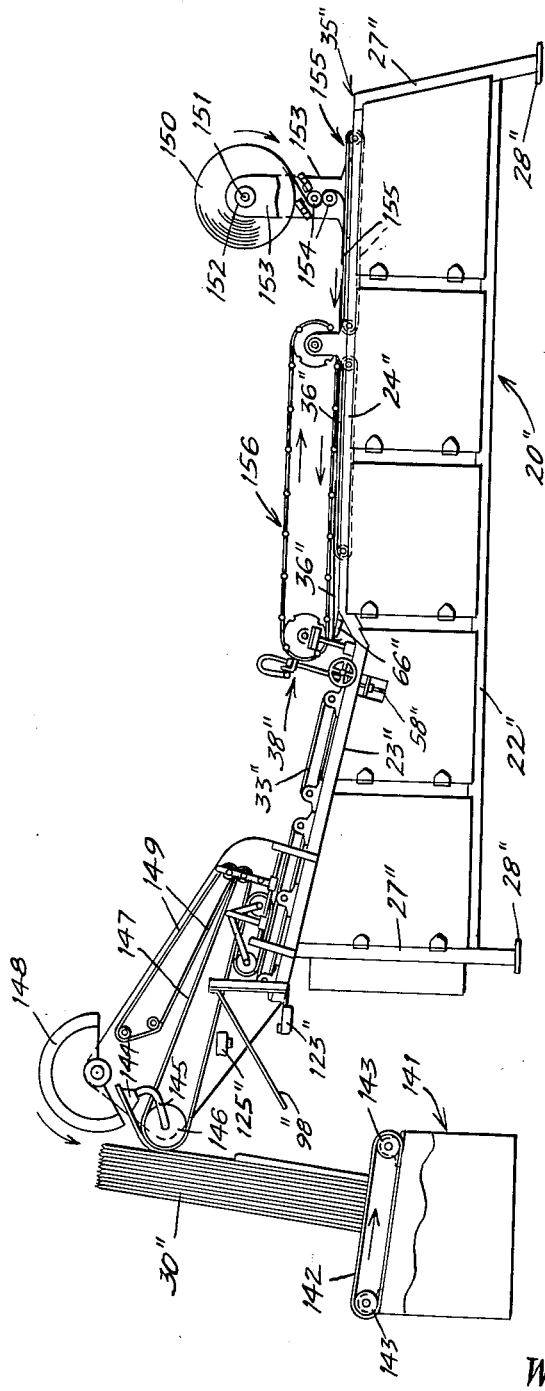

Other and further objects of the invention will become apparent from a reading of the following specification taken in conjunction with the drawings, in which:

FIGURE 1 is a perspective view of an open-mouth paper bag of the type to be lined by the herein disclosed machine, FIGURE 2 is a perspective view of a closed end plastic liner bag positioned and aligned for insertion into the bag of FIGURE 1, FIGURE 3 is a perspective view of the bag of FIGURE 1 lined with the liner of FIGURE 2, FIGURE 4 is a plan view of a preferred semiautomatic embodiment of the invention, FIGURE 5 is a front elevational view of the machine of FIGURE 4, FIGURE 6a is an enlarged plan view of the left half of the machine proper of FIGURE 4, FIGURE 6b is an enlarged plan view of the right half of the disclosure of FIGURE 4, FIGURE 7a is an enlarged front elevational view of the showing of FIGURE 6a, FIGURE 7b is an enlarged front elevational view of the showing of FIGURE 6b, FIGURE 8 is an enlarged fragmentary rear elevational view of the central portion of the machine of FIGURE 5, FIGURE 9 is an enlarged fragmentary elevational view of the lower end of a conveyor device for ejecting the lined bags, FIGURE 10 is a fragmentary perspective view illustrating the initiation of the liner insertion operation, FIGURE 11 is a fragmentary end elevational view of the bag-opening mechanism, FIGURE 12 is a side elevational view of the disclosure of FIGURE 11 from the left side thereof, FIGURE 13 is a schematic wiring diagram for the three-phase motor control circuit, FIGURE 14 is a schematic wiring diagram for the control system of the machine, FIGURE 15 is a plan view of a modified form of the machine having added thereto a bag-sewing device which closes one end of each bag immediately prior to insertion of a plastic liner therein, and FIGURE 16 is a front elevational view of a fully automatic species of the invention, With reference now to FIGURES 4 through 8 of the drawings, the numeral 20 generally designates the bag lining machine, and the numeral 21 an indexer, or counting and bundling apparatus, desirably used therewith. The machine 20 is mounted on and between a lower elongated horizontally disposed rectangular frame 22, and an upper frame formed of two longitudinally aligned frame sections 23 and 24 interconnected centrally of the machine 20 by connecting frame portions 25. The frame section 23 is tilted at an angle of approximately 15° to the horizontal, for a purpose hereinafter explained, so that its upper and outer end lies somewhat above the horizontal plane of the frame section 24 and its inner lower end lies somewhat below the adjacent inner end of the horizontal frame 24, the adjacent frame ends being interconnected in the stepped arrangement shown by the offsetting tilted frame portions 25.

The frame 22 and the superimposed frame sections 23 and 24 are spaced and interconnected by a plurality of upright posts 26 and by four supporting legs 27 having foot plates 28 welded or otherwise fixed thereto. The various elements of the frame, frame sections, posts and legs may conveniently be formed of sections of steel tubes or angle bars and may be welded, bolted or otherwise joined to form a rigid framework for the machine 20.

A slightly inclined platform 29 for holding a stack of bags to be lined, is mounted on supporting posts 31 and 32 above the upper and outer end of the upper frame section 23 in a position for convenient manual movement therefrom of a bag 30 by a downward and inward movement onto a supporting table 33. The table 33 is fixed to and above the frame section 23 and in substantial parallelism therewith by a plurality of short posts 34.

Overlying and fixed to the horizontal frame section 24 there is another table 35 for supporting a stack of plastic liner bags 36. A substantially U-shaped guide member for prestacking the bags may be positioned on the table 35, as shown in FIGURES 4 and 5. The inner ends of the tables 33 and 35 are spaced from each other to define a transversely extending gap adjacent which the open end of a bag 30 and the closed end of a liner 36 are juxtaposed at the beginning of each liner inserting cycle of operation.

The mechanism for positioning, sensing the presence of and automatically opening the end of a bag 30, placed on the sloping table 33 for receiving a liner 36, will now be described.

Said mechanism, generally designated by the numeral 38, is best illustrated in FIGURES 11 and 12. The mechanism 38 comprises an upwardly open channel element 39 fixed at its ends, as by welding, to the side elements 40 and 41 of the tilted frame section 23. Two elongated rectangular blocks 42 and 43 are slidably mounted in and adjacent the ends of the upwardly open channel of bar 39 and each of said blocks has mounted thereon an upwardly facing suction cup 44 which, together with a centrally mounted fixed suction 45, are adapted to engage the positioned bag adjacent its open end for the purposes of opening the bag end and for holding the bag during the liner inserting operation hereinafter more fully described.

A bag stopping and positioning pin 46 is mounted on each of the blocks 42 and 43, as best seen in FIGS. 11 and 12. Also mounted on one of said blocks 42 and 43 is a bag presence detecting feeler 47 operatively connected to a sensitive switch 48 forming part of the semi-automatic control system of the machine 20. Blocks 42 and 43 are made laterally adjustable to accommodate bags 30 of various widths by having threaded axial bores therethrough cooperating with the right and left threads of an adjustment rod 49. The adjustment rod 49 is mounted in a pair of bearings 50 and is rotatable by a hand wheel 51 (FIG. 5).

The cooperating upper suction cups 52 are vertically movably mounted on an angle bar 53 in a slot in the lower web thereof so as to permit lateral adjustment of the end cups 52. The movable cup support 53 is mounted on a pair of vertically extending rods 54, which are vertically guided in a pair of sleeves 55. The sleeves 55 are fixed as by screws 56 to the outer faces of the frame elements 40 and 41.

The lower ends of the lifting rods 54 are interconnected by a bridging angle bar 57. The bar 57 and thereby the cup carrying bar 53 are raised and lowered by a double acting pneumatic cylinder 58 the piston rod 59 of which is fixed to the transverse bar 57 centrally thereof by a nut 60. The cylinder 58 is fixed to the machine 20 by a mounting bracket 61. The lower suction cups 44 and 45 are connected to a source of partial vacuum by flexible hoses 62. The upper suction cups 52 are connected simultaneously to the same source of partial vacuum by flexible hose sections 63 which are, in turn, connected to an immovable rigid conduit 64 by conventional couplers generally designated 65. FIGURE 10 illustrates how upward movement of the bar 53 and its attached suction cups 52 open the mouth of a bag 30 for automatic insertion of a liner 36 by mechanism next to be described.

The liner gripping and inserting mechanism comprises a roughly Y-shaped head generally designated 66. The head 66 has a hollow rectangular base portion 67, a pair of laterally and forwardly curved tubular arms 68 and a pair of hollow inwardly directed wedge-shaped arm extensions 69. The upper surfaces of the extensions 69 are provided with spaced apertures 70 through which vacuum is applied to hold a liner 36 firmly engaged by the head 66 and also through which compressed air is ejected to release the bags 36 from the head 66 at the completion of each insertion stroke of the head 66.

The head 66 is rigidly mounted on a piston rod 71 and on a rigid conduit 72 parallel to the piston rod 71 and adapted to conduct compressed air or to apply a partial vacuum to the interconnected chambers of the head parts. The piston rod 71 is reciprocated to move the head 66, as indicated by the arrows 73 in FIGS. 7a and 10, by a double acting pneumatic cylinder 74 mounted beneath the horizontal table 35 and tilted and positioned for axial alignment with the opened bag 30 positioned on the tilted table 33. The air and vacuum tube 72 (FIG. 6b) is slidably mounted in a pair of guides 74' and 75' and its free end is coupled at 76 to a flexible conduit 77 which leads to a multiple-position valve 78 for alternately and automatically supplying vacuum and compressed air to the head 66. The tube 72 is guided by a set of bearings 74', 79 and 80, these bearings being mounted on a channel bed 24'.

A threaded shaft 81, adjustable by a hand wheel 82, simultaneously adjusts a pair of sensitive switches 83 and 84 forming a part of the semi-automatic control system hereinafter fully described. Switches 83 and 84 have feelers 85 and 86 adapted to engage and be operated by cam-like areas 83' and 84' formed on the tube 72.

The liner inserting stroke of the head 66, as best seen in FIG. 7a, carries the closed end of each lined bag 30 upwardly into engagement with a continuous belt 87. The belt 87 is driven in the direction of the arrow 88 (FIG. 9) by a roller 89. Roller 89 is driven by a belt 90 which, in turn, is driven by a motor 91. The belt 87 is supported and guided by conventional rollers 92 mounted on shafts 93. The shafts 93 are journaled in conventional bearings 94.

The bags 30 are held against the belt 87 by a freewheeling belt 95 held in engagement with the belt 87 by a support mechanism generally designated at 96 and including a pair of parallel spaced wheels 97. As best seen in FIG. 5, the lined bags 30, when ejected by the belts 87 and 95, from the discharge end of the machine 20, are deflected by a deflector plate 98 onto the sloping table top 99 of the indexer and bundling device 21 previously mentioned. The wheels 97 are made of resilient material to reduce engagement shock.

The operation of the machine can best be understood by a simultaneous consideration of the circuit diagram of FIG. 14. With the electrical system connected to an external source of power and the compressed air system coupled to an external air supply, the control switches (not shown) for the constantly running vacuum pump 100 and conveyor motor 91 are closed. Next, a master control switch 101 is closed to energize the entire 110-v. control circuit and to automatically close solenoid operated switches 109 and 114. Closing the master switch 101 also energizes the photoelectric counter system including a lamp 123, a transistor-type amplifier 124 and a photoelectric cell 125 (FIGS. 5 and 14). When a paper bag 30 is positioned with its openable end between the suction cups 44 and 52 (FIG. 11) it engages the control finger 47 of the switch assemblage 48 thus closing the switch contacts 102 thereof. When a plastic liner bag is placed with its closed end covering the vacuum or air ports 70 in the inserter head 66 (FIG. 10), the subsequent build-up of vacuum in the supply line to the head 66 causes a vacuum operated switch 103 to close. The remainder of the circuit sequence follows through automatically without any assistance from the operator or operators. Either the plastic liner or the paper bag may be positioned first in the liner insertion zone of the machine but both must be in positions before the insertion cycle can be initiated.

With switches 102 and 103 closed by operational positioning of a bag 30 and a liner 36, respectively, a solenoid operated four-way maintained-position air-pilot-controlled valve 104' is operated by one of its solenoids 105 to direct compressed air to the upper end of the cylinder 58 (FIG. 11) for lowering the vacuum cups 52 into contact with the bag 30 positioned thereunder. Since the valve 104' is of the maintained-position type, when the solenoid 105 has operated said valve to supply compressed air to the upper end of the cylinder 58 (and simultaneously to release compressed air from the other end of the cylinder) it will continue to do so until its other solenoid 110 is energized long enough to shift said valve to its cylinder stroke reversing position. A double-throw switch 106 (FIGS. 12 and 14) is so connected to the solenoids 105 and 110 that when it breaks the circuit to one it sets up the circuit to the other. The switch 106 is mechanically thrown by a finger 106a mounted on a member 106b bridgingly attached to the angle bars 53 and 57. The finger 106a is bracketed by a bifurcated operating arm 106c of the switch 106.

Lowering of the vacuum cups 52 also effects opening of a switch 111 (FIGS. 8 and 14) in series with the solenoid operator of valve 112 to prevent premature opening thereof, valve 112 controlling the admission of compressed air to the lower end of the cylinder 74 (to effect the liner inserting stroke of the head 66).

When the vacuum cups engage the bag 30, the vacuum begins to build up in the supply line leading thereto and causes a vacuum-operated switch 107 to break the circuit through the switch 109 and to make a circuit through the solenoid of a valve 110, which is thereby opened to admit air to the lower end of the cylinder 58 to effect the raising of the vacuum cups 52 and thereby the opening of the mouth of the bag 30. A solenoid 104 operates a valve which applies vacuum to the cups 52.

As the bag opener shifts to its upper position, the switches 106 and 111 return to their initial positions shown in FIG. 14. The thus reclosed switch 111 energizes and opens an air valve 112 controlling admission of compressed air to the lower end of the cylinder 74 to initiate the liner inserting stroke of the head 66.

When the head 66 has advanced an inch or so, switches 108 and 121 (in a common housing, FIG. 6a) are opened by conventional means (not shown). The opening of the switch 108 while the inserting head 66 is advanced prevents premature closing of the switch 109. The function of the switch 121 will be explained below.

After the inserter head 66 has travelled a predetermined distance, the switch 84 and then the switch 83 are shifted to their other positions (opposite those shown in FIG. 14). The distance the inserting head 66 must travel before shifting the contact positions of switches 84 and 83 is adjustable by the threaded shaft 81, as explained above, to compensate for variable conditions. Shifting of the contact position of the switch 84 causes the switch 114 to open and thus deenergize the valve 112. Simultaneously, a valve 115 is energized to shut off the vacuum to the bag opening vacuum cups. This also allows a vacuum operated switch 107 to return to its original position shown in FIG. 14, while the solenoid of a valve 116 is energized to divert compressed air from the lower to the upper end of the inserter cylinder 74 causing its head-moving piston to coast to a stop and to begin its retracting stroke.

Shifting the contact position of the switch 83 energizes the solenoid of a double valve 119 to shut off the vacuum applied to the inserter head 66 and to direct compressed air into the head to disengage it from the inserted plastic liner 36. This also permits the vacuum operated switch 103 to return to its initial open condition shown in FIG. 14.

As the inserting head 66 penetrates deeply into a bag 30, it fully inserts a liner bag 36 therein and then moves somewhat farther to move the closed end of the bag 30 forwardly until it comes into contact with the conveyor belt 87 above described. The belt 87 and its cooperating belt 95 eject the lined bag from the discharge end of the machine 20 and onto the top 99 of the indexer 21, as previously described. Disengagement of the bag 30 from the operating finger 47 of the bag operated switch 102 permits said switch to return to its initial open position shown in FIG. 14.

As the head 66 is retracted, the switches 84 and 83 are returned to their initial positions of FIG. 14, the switch 84 causing the switch 114 to close and simultaneously deenergizing the valves 115 and 116. The return of the switch 83 to its open condition deenergizes the valve 119.

When the head 66 is fully retracted, the switches 108 and 121 are returned to their original closed positions. The closing of the switch 108 causes closing of the switch 109, while the closing of the switch 121 energizes a double valve 122 which cuts off compressed air from the head 66 and restores its connection to the vacuum line. This completes an operational cycle, and the control parts are reset for a repeat of the cycle described above.

The counter or indexer cycle will now be described. As each ejected lined bag 30 passes through the light beam projected upwardly from the light source 123, it cuts off light from the photoelectric cell 125 which registers the resulting counting impulse in an electronic counting system generally designated 126, a commercially available "Cyclo-Master" unit the construction of which per se does not constitute a part of the herein described invention.

The unit 126 can be set to energize and open a valve 127 after any desired number (from 1 to 100, for example) of counting impulses have been recorded. The opening of the valve 127 operates a conventional air cylinder (not shown) within the indexer 21, which moves the arms 21a to displace the counted stack of lined bags from the stacking zone on the indexer table 99. The valve 127 is deenergized after momentary operation by a time delay switch 128. As the arms 21a approach the end of their stack displacing movements, a switch 129 is closed to energize a valve 130 which produces the return stroke of the cylinder that moves the arms 21a. The indexer is now set for a repeat counting cycle.

In the species of FIG. 15 a bag-sewing attachment generally designated 131 is added to the liner machine 20' (primed numerals being employed to designate parts corresponding to their counterparts designated by unprimed numerals in the species of FIGS. 1–14). The sewing attachment comprises a sewing table 132 on which is mounted a conventional sewing machine head 133. A bag 30' is fed across the table 132 under the sewing machine head simultaneously with a binding tape 134 guided around a post 135 into the sewing zone. A pair of wheels 136 is mounted on a drive shaft 137 for moving the sewed bag 30' under a conveyor formed by a pair of parallel belts 138 mounted on pulleys 139 and driven by a shaft 140. The conveyor belts 138 move each sewed bag 30' onto the table 33' of the machine 20'. The subsequent liner inserting operation then proceeds as in the species of FIGS. 1–14 described above.

FIG. 16 discloses a fully automatic species of the invention. At the left end of the machine 20'' there is located a device 141 for supporting a bundle of bags 30'' upended on a slowly moving conveyor belt 142. The belt 142 is driven by conventional means (not shown) coupled to a pair of rollers 143.

A vacuum cup 144 mounted on an oscillating arm 145 moves counterclockwise to engage a bag 30" and then moves clockwise through approximately 90° to bend the upper end of the bag over a roller 146 so that the bag end can be engaged between a conveyor belt 147 and the approximately semicylindrical surface of a coordinated constantly rotating cooperating conveyor member 148. The belt 147 and the member 148 deliver the bag 30" between the belt 147 and an overlying cooperating conveyor belt 149. The belts 147 and 149 project the bag onto the belt 33" of the liner machine 20".

At the right end of the machine 20" of FIG. 16 there is mounted a roll 150 of flat tubular plastic material. The roll is supported on a spindle 151 extending horizontally and transversely of the table 35" and supported at its ends in bearings 152 mounted in the upper ends of a pair of standards 153. The continuous plastic tube 150 is fed by and between rollers 154 onto a conveyor belt 155. The plastic tube 150 desirably is heat sealed and is perforated to define easily torn severance lines between the adjacent ends of liner sections. However, a rotating cylinder (not shown) could be interposed between the standards 153 and the adjacent end of another conveyor belt 156 cooperating with the belt 155 for moving the liner sections 36" into contact with the inserter head 66". Said rotating cylinder would have perforating and/or severing means and heat sealing means on its surface. The ensuing liner inserting operation proceeds as previously described.

While only several embodiments of the invention have been shown and described herein, it will be readily apparent to those skilled in the art that many minor modifications may be made without departing from the spirit of the invention or the scope of the appended claims.

What is claimed is:

1. A machine for inserting flattened liner bags in flattened paper bags or like containers, comprising: a table-like support for a bag to be lined, a second table-like support for holding liner bags, said supports being endwise opposed to and spaced from each other, upper and lower horizontally and transversely disposed vacuum-actuated means for gripping and holding a bag positioned on said first table-like support, said vacuum actuated means being relatively movable between first closely opposed positions for gripping said bag on opposite margins of the mouth end thereof and second vertically separated positions in which the bag mouth is opened for insertion of a liner bag therein, a plunger substantially axially aligned with the opened bag, a head mounted on the front end of said plunger, said head having air ports therein, means for alternately applying vacuum and compressed air to said ports for sequentially gripping a liner bag for insertion thereof into said bag by said plunger and for freeing said liner bag from said head at the completion of the inserting stroke of said plunger, and means for reciprocating said plunger to and from the liner-inserting and gripping positions thereof.

2. Structure according to claim 1 additionally comprising a holder for a plurality of bags to be lined positioned above the outer end of said first table-like support.

3. Structure according to claim 1 additionally comprising conveyor means for moving and ejecting a lined bag from said machine.

4. Structure according to claim 3, said conveyor means comprising a continuous belt.

5. Structure according to claim 4, additionally comprising a second continuous belt overlying said conveyor belt for effecting positive gripping of said bag therebetween for ejecting thereof.

6. Structure according to claim 5 additionally comprising means for stacking ejected lined bags, and counting means for moving bags from said stacking means in stacks of predetermined counted quantities.

7. Structure according to claim 1, said plunger being fluid-actuated, a valve responsive to positions of said plunger for reversing the direction of the flow of fluid to said plunger to retract the same after the liner-inserting stroke thereof, and second valve means responsive to plunger position for cutting off vacuum to said head and for applying compressed air thereto to free said liner from said head at the end of the liner-inserting stroke of said plunger.

8. Structure according to claim 7 additionally comprising valve means for controlling the reciprocation of said plunger, electric means for operating said valve means, a pair of switches in series with at least a part of said electric means, means responsive to the presence of a bag between said upper and lower vacuum-actuated means for closing one of said switches and vacuum-operated means responsive to a build-up in vacuum in said head caused by presence of a liner bag over the air ports thereof for closing the other of said switches, whereby plunger operation is automatically initiated by proper placement of both the bag and the liner bag in said machine.

9. Structure according to claim 8 additionally comprising means responsive to retraction of said plunger for restoring said switches to their open positions preparatory to initiation of a subsequent bag lining cycle.

10. Structure according to claim 1 additionally comprising a rigid air tube fixed to said head and parallel to said plunger and guides for said air tube, said air tube and guides serving to prevent rotation of head about the axis of said plunger.

11. Structure according to claim 1 additionally comprising means responsive to bag and liner bag presences for causing separation of said upper and lower vacuum-actuated means, means responsive to separation of said vacuum-actuated means for initiating the inserting stroke of said plunger and means responsive to liner-inserting movement of said plunger for arresting and reversing said movement thereof.

12. Structure according to claim 11 additionally comprising means for ejecting a lined bag from said machine, said ejecting means being located beyond the closed end of a bag positioned for lining, said plunger being constructed and arranged to provide a stroke longer than necessary to line said bag, whereby said bag is moved out of lining position by the terminal part of said stroke and into position to be engaged by said ejecting means.

13. Structure according to claim 1, said fluid being compressed air, and means for shutting off the air producing the liner-inserting stroke of said plunger, said plunger thereafter coasting to the end of said stroke for minimizing the mechanical strain and maximizing smoothness of the reciprocation of said plunger.

14. Structure according to claim 1, said first table-like support being tilted downwardly and inwardly toward the central portion of the said machine to facilitate placement of a bag thereon, said plunger being located beneath the other table-like support and being aligned to pass over said first table-like support substantially parallel thereto.

15. Structure according to claim 1 said vacuum-actuated means being spaced aligned suction cups, and means for adjusting the spacing of said suction cups to accommodate bags of various widths.

16. Structure according to claim 1 additionally comprising automatic means for feeding bags to said machine, said last-mentioned means including a reciprocating vaccum gripping means, a pair of spaced parallel rollers, a continuous conveyor belt encompassing said rollers, a constantly rotating cylinder positioned to engage said belt where tangent to one of said rollers, said cylinder being sectorially cut away whereby said reciprocating vacuum means can engage and bend an end of the nearest bag of a stack between said belt and said cut-away cylinder, and a second continuous conveyor belt opposed to said first belt and positioned to grip the end of the bag moved between said belts by said first belt and said cylinder.

17. Structure according to claim 16 additionally comprising automatic means for feeding plastic liner bag sections into said machine in a direction opposed to the feed direction of the bags to be lined, said last-mentioned means including a roll of flat tubular lining material, means for severing said material into liner bags, and means for conveying said bags to a position for engagement with said head when retracted.

18. Structure according to claim 17 additionally comprising means for sealing one end of said liner bags adjacent the line of severance between adjacent sections.

19. Structure according to claim 18, said severance line being produced by aligning perforations providing an easily torn connection between endwise joined liner bag sections.

20. Structure according to claim 1 additionally comprising automatic means for feeding plastic liner bag sections into said machine, said last-mentioned means including a roll of flat tubular lining material, means for severing said material into liner bag sections, and means for conveying said liner bag sections to a position in said machine for engagement by said head when retracted.

21. Structure according to claim 1 additionally comprising a bag-closing attachment positioned adjacent the bag-input end of said machine for closing one end of said bag when the same is fed into said machine.

22. Structure according to claim 21, said bag-closing attachment being a sewing machine.

23. Structure according to claim 22, said sewing machine including means for feeding and holding a binding strip over the end of a bag while being sewed.

24. A machine for inserting flattened liner bags in flattened paper bags or like containers, comprising a support for a bag to be lined, a second support for holding liner bags, said supports being endwise opposed to and spaced from each other, a pair of transversely disposed vacuum-actuated means for gripping and holding a bag positioned by said first support, said vacuum-actuated means being relatively movable between first closely opposed positions for gripping said bag on opposite margins of the mouth end thereof and second separated positions in which the bag mouth is opened for insertion of a liner bag therein, a plunger substantially axially aligned with the opened bag, a head mounted on the front end of said plunger, said head having air ports therein, means for alternately applying vacuum and compressed air to said ports for sequentially gripping a liner bag for insertion thereof into said bag by said plunger and for freeing said liner bag from said head at the completion of the inserting stroke of said plunger, and means for reciprocating said plunger to and from the liner inserting and gripping positions thereof.

25. Structure according to claim 24 additionally comprising means for ejecting and stacking lined bags, and counting means for moving bags from said stacking means in stacks of predetermined counted quantities.

26. Structure according to claim 24, said plunger being fluid actuated, a valve responsive to positions of said plunger for reversing the direction of flow of fluid to said plunger to retract the same after the liner-inserting stroke thereof, and second valve means responsive to plunger position for cutting off vacuum to said head and for applying compressed air thereto to free said liner from said head at the end of the liner-inserting stroke of said plunger.

27. Structure according to claim 24 additionally comprising means responsive to bag and liner bag presences for causing separation of said upper and lower vacuum-actuated means, means responsive to separation of said vacuum-actuated means for initiating the inserting stroke of said plunger and means responsive to liner-inserting movement of said plunger for arresting and reversing said movement thereof.

28. Structure according to claim 24 additionally comprising means for ejecting a lined bag from said machine, said ejecting means being located beyond the closed end of a bag positioned for lining, said plunger being constructed and arranged to provide a stroke longer than necessary to line said bag, whereby said bag is moved out of lining position by the terminal part of said stroke and into position to be engaged by said ejecting means.

29. Structure according to claim 24, said fluid being compressed air, and means for shutting off the air producing the liner-inserting stroke of said plunger, said plunger thereafter coasting to the end of said stroke for minimizing the mechanical strain and maximizing smoothness for the reciprocation of said plunger.

30. Structure according to claim 24, said vacuum-actuated means being spaced aligned suction cups, and means for adjusting the spacing of said suction cups to accommodate bags of various widths.

31. Structure according to claim 24 additionally comprising automatic means for feeding bags to said machine, said last-mentioned means including a reciprocating vacuum gripping means, a pair of spaced parallel rollers, a continuous conveyor belt encompassing said rollers, a constantly rotating cylinder positioned to engage said belt where tangent to one of said rollers, said cylinder being sectorially cut away whereby said reciprocating vacuum means can engage and bend an end of the nearest bag of a stack between said belt and said cut-away cylinder, and a second continuous conveyor belt opposed to said first belt and positioned to grip the end of the bag moved between said belts by said first belt and said cylinder.

32. Structure according to claim 31 additionally comprising automatic means for feeding plastic liner bag sections into said machine in a direction opposed to the feed direction of the bags to be lined, said last-mentioned means including a roll of flat tubular lining material, means for severing said material into liner bags, and means for conveying said bags to a position for engagement with said head when retracted.

33. Structure according to claim 32 additionally comprising means for sealing one end of said liner bags adjacent the line of severance between adjacent sections.

34. Structure according to claim 24 additionally comprising automatic means for feeding plastic liner bag sections into said machine, said last-mentioned means including a roll of flat tubular lining material, means for severing said material into liner bag sections, and means for conveying said liner bag sections to a position in said machine for engagement by said head when retracted.

35. Structure according to claim 24 additionally comprising a bag-closing attachment positioned adjacent the bag-input end of said machine for closing one end when the same is fed into said machine.

References Cited in the file of this patent

UNITED STATES PATENTS

| | | |
|---|---|---|
| 2,893,294 | Eaton et al. | July 7, 1959 |
| 2,896,516 | Tilton et al. | July 28, 1959 |
| 2,986,079 | Triolo | May 30, 1961 |